Figure 7:
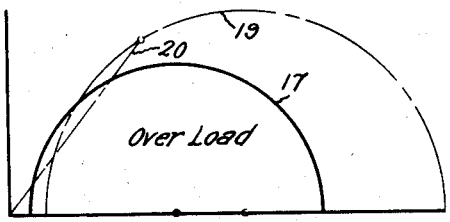

Aug. 10, 1926.

H. M. HOBART

CONDENSER SYSTEM

Filed Nov. 4, 1924

1,595,937

Inventor:
Henry M. Hobart,
by
His Attorney.

Patented Aug. 10, 1926.

1,595,937

UNITED STATES PATENT OFFICE.

HENRY M. HOBART, OF SCHENECTADY, NEW YORK, ASSIGNOR TO GENERAL ELECTRIC COMPANY, A CORPORATION OF NEW YORK.

CONDENSER SYSTEM.

Application filed November 4, 1924. Serial No. 747,840.

My invention relates to a condenser system for improving the performance of inductive apparatus. In describing my invention, I will take for illustrative purposes the well known case of the induction motor and explain how its performance may be improved by the use of my condenser system.

The use of condensers for improving the power factor of a circuit to which induction motors are connected by connecting the condensers in parallel with the circuit is well known. Such an arrangement serves to supply leading current to an otherwise lagging current system, but it has no effect upon the performance of the induction motor itself as regards its inherent characteristics. My invention has to do with a condenser system as used to improve the performance of inductive apparatus and in particular the operating performance of induction motors, any power factor improvement of the system to which the motor is connected being an incidental benefit.

At very light loads the core loss of an induction motor plays a considerable part in decreasing the efficiency and if such motors could at low loads and when unloaded be operated at voltages quite a good deal below the circuit voltage, the light load efficiencies and the all-day efficiency would be improved. At large loads and at overloads, the I²R losses predominate; consequently, if at large loads and at overloads the voltage at the terminals of the motor could be increased above the circuit voltage, the efficiency of the motor at these loads would be improved, and the all-day efficiency would also be further slightly improved as compared with constant voltage operation. Furthermore, the greatest load which an induction motor can carry without stalling increases with the terminal voltage so that also for that reason an increase in voltage for the overload is desirable and would permit of increasing the rating of a motor provided the increased rating would not occasion too high a temperature. Often the design of an induction motor as regards ventilation could be modified to advantage to permit of increasing its rating where such voltage regulation is employed. Still more often the motor, as usually designed, does not, with its constant voltage rating, attain the limiting temperature rise. An increase in voltage above normal for increasing the stalling load is particularly desirable for low speed induction motors, since it is difficult to design such motors to have as high a stalling load as is desired and the stalling load rather than the temperature is considered by many designers to be a limiting factor in controlling the rating of low speed induction motors.

Figure 2:
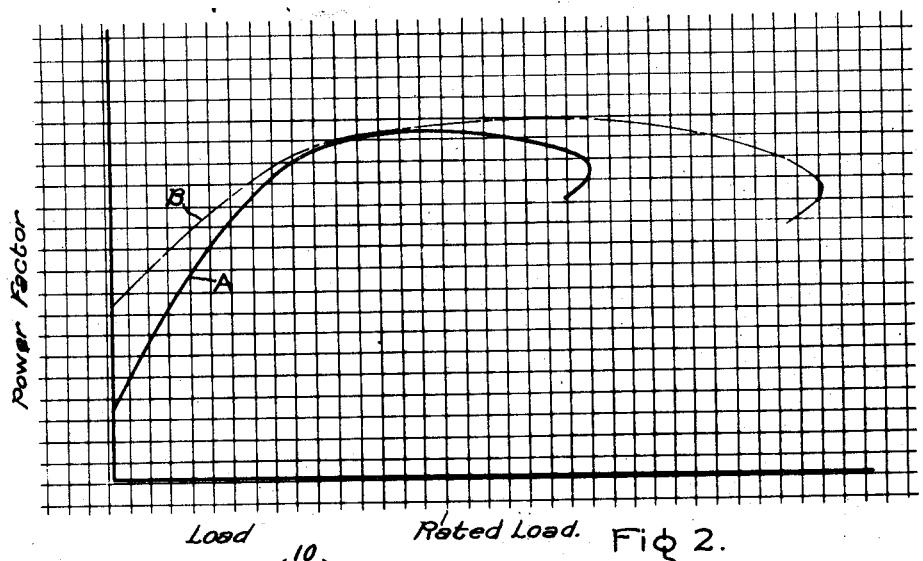
Figure 1:
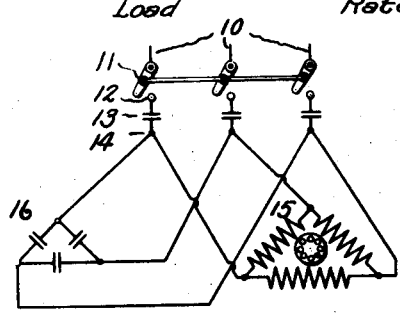

In carrying my invention into effect, I connect condensers or condenser apparatus in series with the inductive apparatus and in certain cases I also provide condenser apparatus in parallel with the inductive apparatus. By properly proportioning the rating of the various pieces of apparatus thus connected together, a remarkable improvement in the performance of the inductive apparatus is obtained by reason of the fact that its terminal voltage is automatically made to increase with increase in load for a given voltage on the supply system. This change in voltage is due to the fact that when a leading current is supplied through series condensers, the voltage on the load side of the condensers is lowered and when a lagging current is supplied through series condensers, the voltage on the load side is increased. The preferred arrangement by which these principles are utilized in carrying out my invention will be described in connection with the accompanying drawing wherein Fig. 1 represents the circuit connections of the apparatus used; Fig. 2 represents power factor load curves of an induction motor when used with and without my condenser system; and Figs. 3 to 7 inclusive represent comparative circle diagrams of an induction motor at different loads with and without my condenser system.

The features of my invention which are believed to be new and patentable will be pointed out in the claims appended hereto.

Referring now to Fig. 1, 10 represents an ordinary polyphase alternating current supply system, for example, a 3-phase, 60 cycle system. A line switch is represented at 11 and when this switch is closed, line voltage will be applied at points 12. 13 represents series connected condenser apparatus interposed between the line switch 11 and the terminals 14 of inductive apparatus 15, here represented as a squirrel cage induction motor. Across the terminals 14 are connected condenser apparatus 16 which will be assumed to have such KVA capacity as to just neutralize the lagging KVA of the induction motor 15 at some selected load such as 3/4 load. The condenser apparatus 13 and 16 may be of any desired form, such for example as static condensers, electrolytic condensers, or synchronous condenser apparatus and if desirable, the condenser apparatus may be of variable capacity.

As thus connected, it will appear that for no load on the induction motor and for loads less than 3/4 load, the leading current taken by the condenser apparatus 16 will exceed the lagging current or rather the lagging component of the current taken by the induction motor, so that a resultant leading current will be drawn from the line 10 through a series condenser. This lowers the voltage and consequently a voltage lower than line voltage will be supplied to the induction motor for light loads, the voltage being the lowest at no load and gradually increasing up to full line voltage at 3/4 load in the case assumed. For loads greater than 3/4 load, the lagging current component of the motor will exceed the leading current of the condenser apparatus 16 and consequently a resultant lagging current will be drawn through the series condenser apparatus 13 which then increases the voltage at the terminals of the motor above line voltage; for example, if the system voltage 10 is 230 volts, the no load voltage of the motor may be reduced to say 200 volts. At 3/4 load, the motor voltage is 230 and at some overload it may be increased to 260 volts. This has the beneficial results previously mentioned, of decreasing the motor core losses at low loads and increasing its stalling load capacity and its starting torque which latter conditions occur with more than 3/4 load current. The power factor at all loads other than 3/4 load in the case assumed, is improved and where the motor is a low speed motor, the rating of the motor may be increased.

In Fig. 2, curve A represents the power factor load curve of such a motor without the use of my condenser system and curve B represents the corresponding curve which may be expected with the same motor as used with my condenser system. These curves also show by the hooks in their upper ends the comparative stalling loads which may be expected with and without the condenser system.

In Figs. 3 to 7 inclusive, the full line diagrams represent the circle diagram 17 and current vector 18 at various loads of the motor without the use of the condenser system and the dotted line diagrams represent the circle diagram 19 and the current vector 20 of the same motor at corresponding loads which may be expected when used with my condenser system. The full line diagram in each case represents the condition with constant voltage and consequently the circular part is of constant radius. The dotted semi-circle, which is representative of a gradually increasing voltage condition with load, increases accordingly.

Figure 3:
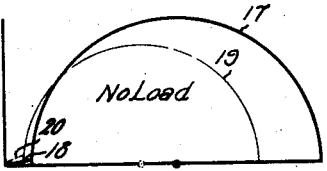

Fig. 3 may be taken as representing the no load condition and it will be seen that the power factor of the motor is a little better for the dotted line diagrams than for the full line diagram; also, the motor current is less for the dotted line diagrams. The same is true of Fig. 4, which is intended to represent a light load condition.

Figure 5:
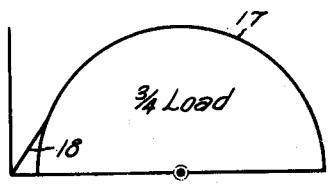
Figure 4:
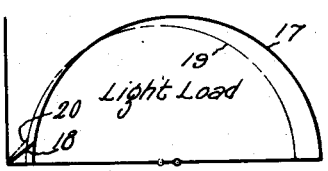

Fig. 5 may be taken as corresponding to 3/4 load and it is at this point that no change occurs in the characteristics of the motor for the two systems of connection, and consequently the two diagrams coincide.

Figure 6:
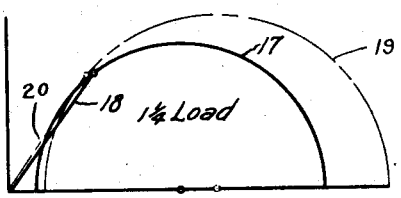

Fig. 6 is for a still greater load, say 1 1/4 load, and Fig. 7 is for a load exceeding in value the load which would stall the motor as usually connected, but which is within the non-stalling capacity of the motor when used with my condenser system.

It will appear that the advantages of my invention may be realized to a certain extent by omitting the parallel connected condenser apparatus 16, since in such a case the motor voltage would be increased from approximately line voltage at no load to a voltage in excess of line voltage with increasing load. If the parallel connected condenser apparatus is omitted, the invention is not so generally applicable for motors designed for line voltage. In other words, if a 30% range of voltage is desired, it may be obtained by the use of the complete condenser system, working 15% below line voltage to 15% above line voltage without running into saturation and heating difficulties. If the parallel connected condenser apparatus is omitted, the 30% range must be from line voltage upward and it would then often be necessary to specially design the motor for a higher voltage or to be satisfied with a more limited voltage operating range.

In accordance with the provisions of the patent statutes, I have described the principle of operation of my invention, together with the apparatus which I now consider to represent the best embodiment thereof; but I desire to have it understood that the apparatus shown and described is only illustrative and that the invention can be carried out by other means.

What I claim as new and desire to secure by Letters Patent of the United States, is:

1. In combination, an alternating current distribution system, inductive apparatus connected to said system, condenser apparatus connected in series between said system and inductive apparatus, and other condenser apparatus having a rated KVA capacity less than the rated lagging KVA capacity of the inductive apparatus connected in parallel with the terminals of said inductive apparatus.

2. In combination, an alternating current distribution system, an induction motor supplied thereby, and shunt and series condenser apparatus associated with said induction motor arranged to automatically lower the voltage at the motor terminals below the system voltage for light loads and to raise such voltage above the system voltage at heavy loads.

3. In combination, an alternating current distribution system, inductive apparatus supplied thereby, and means associated with said inductive apparatus for automatically lowering the voltage applied at the terminals of said inductive apparatus below the system voltage at light loads on said inductive apparatus, said means being automatically responsive to the lagging component of the load current of said inductive apparatus for increasing the terminal voltage above the system voltage for heavy loads.

4. In combination, an alternating current distribution system, apparatus supplied thereby designed to draw a resultant leading current from said system at light loads and a resultant lagging current at heavy loads and condenser apparatus connected in series with the supply leads to said apparatus between it and the supply system for regulating the voltage at the terminals of said apparatus in proportion to the load thereon.

In witness whereof, I have hereunto set my hand this 3rd day of November 1924.

HENRY M. HOBART.